2,948,693
Patented Aug. 9, 1960

2,948,693

MALEIMIDE-MODIFIED OILS

Pliny O. Tawney, Passaic, N.J., assignor to United States Rubber Company, New York, N.Y., a corporation of New Jersey No Drawing. Filed June 26, 1957, Ser. No. 668,023

7 Claims. (Cl. 260—21)

This invention relates to new maleimidized products made from maleimide and saturated aliphatic alcohol esters of non-conjugated olefinic non-hydroxylated aliphatic acids, and to the use of the products in compatible mixtures with urea:formaldehyde resins, melamine:formaldehyde resins, nylon or polyvinyl chloride resins to form varnish and coating compositions.

The reaction products of maleic anhydride with such esters are well known. However, these products cannot be used as plasticizers or extenders for soluble urea:formaldehyde resins or melamine:formaldehyde resins because of lack of compatibility and because the carboxyl groups, either as such or as anhydride, furnished by the maleic anhydride portion of the said products are so acidic that they catalyze the rapid gelation of the said resins at room temperature. Therefore, such mixtures are unstable.

The reaction products of maleimide with olefins or vinyl acetate also are known. However, these products are rubbery or resinous solids which are not suitable as plasticizers for urea:formaldehyde resins or melamine:formaldehyde resins.

In contrast, the aforesaid maleimidized products of this invention are liquids which are compatible with the said resins, and do not cause them to gel at room temperature. Thus, mixtures of these new maleimidized products and such resins are stable at room temperature, e.g., 20–25° C. Moreover, the mixtures react at high temperature, e.g., at from about 100° C. to about 175° C., to form dry, tough, hard, substantially clear films and coatings.

The reaction between the ester, which may be in the form of a natural oil or fat, and maleimide, occurs at any temperature between about 175° C. and about 250° C., preferably at about 200° C. However, maleimide also polymerizes in this temperature range to form material which is insoluble in the mixture of maleimide, ester and/or the products of this invention. If the ester and maleimide merely are mixed and then heated, much insoluble material will be formed, and little or none of the desired product will be obtained. This unwanted reaction can be suppressed or minimized by one or both of the following methods:

(1) The concentration of maleimide is kept so low that most or all of it reacts with the ester in the desired way. This can be conveniently done by dissolving the maleimide in any inert volatile solvent such as acetone or dioxan. This solution is added gradually to the rapidly stirred ester at the reaction temperature. The solvent, of course, flashes off and can be recovered by condensation. It is more economical to add undiluted, molten maleimide to the hot, stirred ester. The maleimide solution or the molten maleimide is added at such a rate that it reacts substantially as fast as it is added. This rate can be found by mere trial since it varies with the temperature, speed of stirring, the particular ester, etc.

(2) An inhibitor of free-radical polymerization, of which many are known, may be present during the reaction in order to slow down polymerization if any considerable amount of unreacted maleimide is present in the reaction mixture. Typical inhibitors are hydroquinone and p-tert.-butylcatechol.

The acids whose esters are used are chosen from the non-conjugated, olefinic, non-hydroxylated aliphatic acids having from 12 to 24 carbon atoms. Typical acids are lauroleic acid, myristoleic acid, palmitoleic acid, oleic acid, gadoleic acid, erucic acid, linoleic acid, linolenic acid, arachidonic acid and lupanodonic acid.

Esters of any of these acids with monohydric or polyhydric saturated, unsubstituted, aliphatic alcohols react with maleimide to form the products of this invention. Typical alcohols are methanol, ethanol, propanol, isopropanol, the butanols, ethylene glycol, propylene glycol, trimethylene glycol, and glycerol.

The esters used in this invention need not be pure. In fact, the most important ones are the naturally occurring fats and oils. Such materials are mixed glycerides of saturated acids, non-conjugated olefinic acids and conjugated olefinic acids. The fats and oils which are operable in this invention are those which have an iodine number (Wijs) of at least about 50 and a very low content, i.e., less than about 5%, of esterified conjugated acids. The average composition and properties of commercially available fats and oils are given in "Tables and Data" (1955), pp. 28–29, assembled by the United States Testing Co. Typical fats and oils operable in this invention are corn oil, cotton seed oil, linseed oil, olive oil, palm oil, peanut oil, perilla oil, rapeseed oil, safflower oil, sesame oil, soybean oil, lard, neat's-foot oil, herring oil, menhaden oil, sardine oil and sperm oil. These materials are not fully equivalent among themselves. I prefer to use linseed oil or soybean oil. Babassu oil, cocoanut oil, and tallow are inoperable because they contain too low a content of esterified acids of the suitable type, and thus have too low a Wijs number. Oils such as oiticica oil, tall oil and tung oil are inoperable because they have so high a content, i.e., 10% or more, of esterified conjugated olefinic acids that they gel rapidly when one tries to react them with maleimide.

The amount of maleimide which is mixed with the olefinic acid or ester depends on the number of olefinic groups in the acid or ester. Therefore, the amount cannot be given in absolute terms. However, in general, it is desirable to react one mol of maleimide per one to six equivalents of the acid or ester, where "equivalent" means the average amount of acid or ester needed to furnish one mol of olefinic groups. When a pure ester is used, this amount is obvious from the structural formula of the compound, but when a mixture, e.g., a natural oil, is used the amount is calculated from the Wijs number of the oil. The Wijs number is defined as the parts by weight of iodine which react with 100 parts of the olefinic material. One olefinic equivalent=

$$\frac{\text{molecular weight of iodine} \times 100}{\text{Wijs number}}$$

$$= \frac{253.8 \times 100}{\text{parts iodine per 100 parts material}}$$

These new maleimidized oils are useful extenders and modifiers of various nitrogenous resins which are used in making coatings and films.

These resins include, especially, the following:

The urea:formaldehyde resins, especially the alcohol-soluble ones. These resins are made by chemical combination of a water-soluble urea:formaldehyde condensate with an alcohol such as butyl, amyl or octyl alcohol to form an ether-type material which is soluble in organic solvents, according to a bulletin, "Uformite," published in 1953, by the Rohm and Haas Company. Typical resins which are operable in this invention are Uformite F-200E, which is sold as a 50% solution (all parts and percentages are by weight) in a mixture of xylol and butanol (1:1), Uformite F-226E, sold as a 50% solution in a mixture of octanol and butanol, and Uformite F-240, sold as a 60% solution in a mixture of xylol and butanol (2:3). The resins are ethers of the same alcohol, or mixture of alcohols, used as solvent medium.

The melamine:formaldehyde resins, especially the alcohol-soluble ones, i.e., those which are chemically combined with an alcohol such as butanol. Typical resins are Uformite MM-46, sold as a 60% solution in a mixture of xylol and butanol (1:1); and Uformite MM-55, sold as a 50% solution in a mixture of xylol and butanol (1:4); see the said bulletin.

Resins made by condensing a mixture of urea and melamine with formaldehyde also are operable. A typical resin is Uformite MU-56, made from a 1:4 mixture of urea and melamine, and sold as a 50% solution in a mixture of xylol and butanol, according to the said bulletin.

The nylons, by which is meant, generally, the superpolyamides, whether the unmodified long-chain polyamides, e.g., nylon 66 and nylon 6, or the modified superpolyamides, e.g., the methylolated ether nylons, e.g., nylon type 8, made by reaction between a polyamide nylon, formaldehyde and an alcohol. The last type is described in U.S. Patents No. 2,430,860, dated November 18, 1947, to Theodore L. Cairns, No. 2,430,866, dated November 18, 1947, to Henry D. Foster and Arthur W. Larchar, No. 2,430,875, dated November 18, 1947, to Alban T. Hallowell and Henry D. Foster, and No. 2,430,923, dated November 18, 1947, to Henry D. Foster and Arthur W. Larchar.

The new maleimidized oils also are compatible with, and useful as extenders and modifiers for coatings and films made from polyvinyl chloride resins. Typical resins are the Marvinols and the Geons.

The following examples illustrate the invention. All parts and percentages are by weight.

Examples 1-3 are concerned with the preparation of the maleimidized oils.

The amount of maleimidized oil in 100 parts of a mixture of the oil and solid resin can range between about 40 parts and about 80 parts, and conversely the amount of resin ranges between about 60 parts and about 20 parts. If less than 40 parts of oil are used the resin is inadequately plasticized to decrease brittleness of films; if more than 80 parts are used the films are too soft. I prefer to use from about 50 parts to about 75 parts of oil.

*Example 1*

Raw alkali-refined linseed oil (87.5 parts) was heated to 200° C., rapidly stirred and kept under nitrogen throughout the reaction. A solution of 29.1 parts of maleimide in 40 parts of acetone was added during 30 minutes to the oil. The acetone, which flashed off, was condensed for re-use. Heating was continued for 30 minutes more, and the mixture was cooled and thinned with 80 parts of benzene in order to facilitate filtration of insoluble polymer. The filtrate was distilled in vacuo to remove benzene and unreacted maleimide. The cooled residue was washed with water to be sure that no unreacted maleimide remained in the oil. The washed material was heated again at 200° C. at 0.1 mm. Nothing except a trace of water came off. The wash water also contained too little maleimide to detect, showing that the first vacuum distillation was adequate to remove all of the unreacted maleimide. The following materials, other than acetone and benzene, were recovered:

11 parts yellow, insoluble solid polymer
22 parts maleimide
83 parts clear amber, oil residue which contains 1.27% nitrogen, and has a viscosity (Gardner-Holt) of 3.7 poises at room temperature (20-25° C.). The untreated linseed oil contains no nitrogen, and has a viscosity of 0.5 poises.

*Control A.*—The experiment of this example was repeated except that pure acetone was used instead of the mixture of acetone and maleimide. The oil has the following properties:

|  | Raw | After Acetone Treatment |
|---|---|---|
| Saponification Number | 224 | 207 |
| Acid Number | 0.5 | 0.5 |
| Iodine Number (Wijs) | 189 | 133 |

*Example 2*

Raw, alkali-refined soybean oil was treated with maleimide by the method shown in Example 1. Recovery was:

10 parts insoluble polymer
6 parts maleimide
98 parts clear, pale amber oily residue which contains 2.01% nitrogen, and has a viscosity of 27 poises. The untreated soybean oil contains no nitrogen, and has a viscosity of 0.5 poises.

*Control B.*—The experiment of this example was repeated except that pure acetone was used instead of the mixture of acetone and maleimide. The oil has the following properties:

|  | Raw | After Acetone Treatment |
|---|---|---|
| Saponification Number | 228 | 195 |
| Acid Number | 0.4 | 0.5 |
| Iodine Number (Wijs) | 125 | 95 |

*Example 3*

A solution of 48.5 parts of maleimide in 145.5 parts of acetone was added gradually during 2.5 hours to a mixture of 437.5 parts of linseed oil and 1.0 part of hydroquinone at 200-210° C. under nitrogen. No insoluble polymer formed. The liquid material remaining after the acetone flashed off was heated at 0.2 mm. Hg at 200° C. to remove any unreacted maleimide and other volatile material. The residue was a pale yellow, slightly hazy oil. The haze was removed by filtration through diatomaceous earth. The yield of the product was 480 parts, nitrogen content 1.34%. Recovered volatile material, other than acetone, weighed 5.2 parts. It consisted chiefly of maleimide and hydroquinone or quinone. This reaction product of linseed oil and maleimide formed compatible, clear mixtures with Uformite F-226E.

This example shows that formation of insoluble polymer can be suppressed by the presence of an inhibitor of free-radical polymerization during the reaction between maleimide and an olefinic oil.

The following examples show typical coating compositions made from maleimidized oils. Where solutions are shown, the parts refer to the solution, not to the solid content.

*Example 4*

Solutions of nitrogenous resins are mixed with the oils, and the mixtures are poured onto glass plates to form coatings. These are allowed to dry at room temperature, and then are baked in a circulating air oven for three hours at 250° F. (121° C.).

| Composition | 1 | 2 | 3 | 4 | 5 |
|---|---|---|---|---|---|
| Maleimidized linseed oil (Ex. 1) | 25 | 25 | | | |
| Control A (Ex. 1) | | | 25 | | |
| Raw alkali-refined linseed oil | | | | 25 | 25 |
| Uformite F-226E (50% solids) | 50 | | 50 | 50 | |
| Uformite MM-55 (50% solids) | | 50 | | | 50 |
| Appearance of baked film [a] | C | C | I | I | I |

[a] "C" means compatible; "I" means incompatible, i.e., opaque and usually having a separate oil layer.

Coatings 1 and 2, which illustrate the invention, are hard, clear, pale yellow and dry. Coatings 3, 4 and 5, which are controls, are opaque, mottled, soft and oily. This example shows the beneficial effect of chemically modifying linseed oil with maleimide.

*Example 5*

The following coatings are made by the method of Example 4.

| Composition | 6 | 7 | 8 | 9 | 10 |
|---|---|---|---|---|---|
| Maleimidized soybean oil (Ex. 2) | 25 | 25 | | | |
| Control B (Ex. 2) | | | 25 | | |
| Raw Alkali-refined soybean oil | | | | 25 | 25 |
| Uformite F-226E (50% solids) | 50 | | 50 | 50 | |
| Uformite MM-55 (50% solids) | | 50 | | | 50 |
| Appearance of baked film | C | C | I | I | I |

Coatings 6 and 7, which illustrate the invention, are hard, clear, almost colorless and dry. Coatings 8, 9 and 10, which are controls, are opaque, mottled, dull and almost white, soft and oily. This example shows the beneficial effect of chemically modifying soybean oil with maleimide.

*Example 6*

The following coatings are made by the method of Example 4.

| Composition | 11 | 12 | 13 | 14 |
|---|---|---|---|---|
| Maleimidized linseed oil (Ex. 1) | 10 | | 10 | |
| Maleimidized soybean oil (Ex. 2) | | 10 | | 10 |
| Nylon type 8 (10% in dimethylformamide) | 100 | 100 | | |
| Marvinol VR-30 a (10% in butanone) | | | 100 | 100 |
| Appearance of baked film | C b | C | C | C | a Polyvinyl chloride.
b Coating is hard and dry but very slightly cloudy.

This example shows that these new maleimidized oils are compatible with polyvinyl chloride and nylon. The corresponding raw alkali-refined oils and control oils A and B (Examples 1 and 2) are incompatible with these resins.

Having thus described my invention, what I claim and desire to protect by Letters Patent is:

1. The liquid products of reaction of maleimide and an ester of a non-conjugated olefinic non-hydroxylated aliphatic acid having from 12 to 24 carbon atoms with a saturated aliphatic alcohol, said products being substantially free of insoluble polymers of said maleimide.

2. A heat-hardened layer consisting essentially of a stable compatible mixture of a product as set forth in claim 1 with a resin from the group consisting of urea-formaldehyde, melamine-formaldehyde, urea-melamine-formaldehyde, polyvinyl chloride, and the nylon resins.

3. A product as set forth in claim 2 in which the maleimidized ester ranges from about 40 parts to about 80 parts, and the resin correspondingly ranges from about 60 parts to about 20 parts, based on 100 parts, by weight, of the mixture of said ester and resin.

4. A liquid product of reaction of maleimide and linseed oil, substantially free of insoluble polymerized maleimide.

5. A product as set forth in claim 3, containing in addition, an inhibitor of free-radical polymerization.

6. A liquid product of reaction of maleimide and soybean oil, substantially free of insoluble polymerized maleimide.

7. A product as set forth in claim 4, containing in addition, an inhibitor of free-radical polymerization.

References Cited in the file of this patent

UNITED STATES PATENTS

| | | |
|---|---|---|
| 2,313,565 | McDowell et al. | Mar. 9, 1943 |
| 2,342,295 | Orthner et al. | Feb. 22, 1944 |
| 2,452,315 | Morgan et al. | Oct. 26, 1948 |
| 2,487,105 | Cornwell | Nov. 8, 1949 |
| 2,487,106 | Cornwell | Nov. 8, 1949 |
| 2,537,667 | Harris | Jan. 9, 1951 |
| 2,547,494 | Rowland | Apr. 3, 1951 |
| 2,579,939 | Lindenfelser et al. | Dec. 25, 1951 |
| 2,649,423 | Spencer | Aug. 18, 1953 |
| 2,662,898 | Ross et al. | Dec. 15, 1953 |
| 2,721,186 | Tawney | Oct. 18, 1955 |
| 2,790,787 | Tawney | Apr. 30, 1957 |

OTHER REFERENCES

Harvey: Maleimide as a Dienophile, pages 1121–1122, J. Amer. Chem. Soc., vol. 71 (March, 1949).

Payne: Organic Coating Technology, pages 89–101, John Wiley (1954).